United States Patent [19]

Tsuo et al.

[11] Patent Number: 5,194,349

[45] Date of Patent: Mar. 16, 1993

[54] ERASABLE, MULTIPLE LEVEL LOGIC OPTICAL MEMORY DISK

[75] Inventors: Y. Simon Tsuo, Golden; Jack L. Stone, Lakewood, both of Colo.

[73] Assignee: Midwest Research Institute, Kansas City, Mo.

[21] Appl. No.: 832,387

[22] Filed: Feb. 7, 1992

[51] Int. Cl.$^5$ ............................................. G11B 7/24
[52] U.S. Cl. .................................. 430/21; 430/19; 430/321; 430/495; 430/945; 365/113; 346/135.1
[58] Field of Search ................ 430/21, 19, 495, 945, 430/321; 369/275.2, 288; 346/135.1; 365/113

[56] References Cited

U.S. PATENT DOCUMENTS

| | | | |
|---|---|---|---|
| 3,900,736 | 8/1975 | Michail et al. | 250/492 A |
| 4,322,839 | 3/1982 | Yamashita et al. | 369/122 |
| 4,571,348 | 2/1986 | Troxell | 427/38 |
| 4,613,519 | 9/1986 | Yacobi | 365/114 |
| 4,710,911 | 12/1987 | Yamada et al. | 369/100 |
| 4,787,077 | 11/1988 | Barton et al. | 369/100 |
| 4,818,666 | 4/1989 | Gravesteijn et al. | 430/495 |

OTHER PUBLICATIONS

English language Abstract of Japanese Patent Application JP 61-240450, Ishihara, "Storage Element", Oct. 1986.

*Primary Examiner*—Charles L. Bowers, Jr.
*Assistant Examiner*—John A. McPherson
*Attorney, Agent, or Firm*—Ken Richardson

[57] ABSTRACT

A process for preparing a multiple level logic optical memory disks which are erasable upon heating when ion-beam hydrogenation is used for writing informatin on the disk.

The process comprises depositing an amorphous film selected from the group consisting of silicon hydride, silicon carbon hydride and silicon nitrogen hydride on a glass substrate using plasma enhanced chemical vapor deposition at temperatures sufficient to ensure good adhesion and high film quality and an optical bandgap of between aboout 1.55 and about 2.0 eV; writing information on these disks by using a laser beam to selectively heat spots of the film to expel hydrogen and change the bandgap and optical absorption of the film; and using a laser beam at a sufficient nm wavelength in order to detect information stored on these disks.

28 Claims, 1 Drawing Sheet

FIG.1

ERASABLE, MULTIPLE LEVEL LOGIC OPTICAL MEMORY DISK

DESCRIPTION

1. Technical Field

The invention relates to a method for combining amorphous silicon storage recording film and detector arrays on the same glass substrate to produce an erasable optical recording, by providing a thin a-Si film by using a hydrogen ion beam, in a prescribed manner to hydrogenate the film to produce optical marks of altered transmissibility; and if required, heating the film above about 400° C. to drive out hydrogen.

2. Prior Art

Optical recording systems have the known advantages of high information storage density and rapid access time. Further, most optical recording media are made of low-melting-temperature material, and recording is achieved by the physical and metallurgical changes produced in optical storage media by laser writing, e.g., as in laser writing in bilayer media with low melting points such as Te/Se and Te/C.

In optical recording systems, it is known that optical recording media using amorphous-silicon-based thin films (a-Si films) have been studied since the early 1970s; however, optical diffraction and lateral heat diffusion in the a-Si film has limited resolution and the laser heating technology is not erasable.

U.S. Pat. No. 4,571,348 discloses a process for reducing the hydrogen content of a-Si:H by heating and by a method of $^{28}Si+$ ion implantation at 170 keV to reduce blistering of the film during heating (dehydrogenation). This patent utilizes ion implantation to structurally damage the film and argon, a halogen and nitrogen are discussed as other possible ion species to generate the implantation damages In other words, this patent is directed to methods of reducing the formation of blisters during heating in order to reduce the hydrogen content of vacuum deposited films. This patent does not in fact utilize ion implantation for hydrogenation and does not at all pertain to optical recording. Further, this paten does not pertain to using reduced hydrogen content of films deposited on glass substrates for optical memory disk and it does not discuss using an optical bandgap and the infrared absorption properties of silicon-hydrogen bonds in a transmission mode optical memory disk.

A method of converting crystalline material into amorphous material by laser beams used to write on optical disk is disclosed in U.S. Pat. No. 4,818,666; however, this crystallization method of writing is slow, requires higher energy, and is difficult to erase.

U.S. Pat. No. 4,710,911 discloses methods of writing by converting crystalline material into amorphous material using laser beams, wherein the laser beams are used to melt the recording media and a cooling rate is utilized in a controlled manner to obtain a recorded state or an erased state in a reflection-mode optical disk.

A method of writing by converting crystalline material into amorphous material by laser beams, wherein the particular class of materials is GeTe and related compounds and alloys in a reflection-mode of optical disk is disclosed in U.S. Pat. No. 4,787,077; however, it is the particular class of materials to which this patent is addressed that is important for the method of writing therein.

U.S. Pat. No. 4,322,839 discloses the general principles of reflection and transmission-mode laser disk and also covers the use of a group of materials as the recording medium for laser disk, such as $TeO_x$ ($0<x<2$) including 5 percent PbO and 5 percent $V_2O_5$ as a suboxide, a tellurium oxide, a chalcogenide, GeTeS and related alloys; however, the method of this patent does not include the use of amorphous silicon or its related alloys.

Apparatus for scanning charged particles for generating integrated circuit patterns on semiconductor wafers is disclosed in U.S. Pat. No. 3,900,736. However, the scanning mechanism is not taught as an instrument for providing a thin a-Si film or using a focused ion beam in a prescribed manner to create by hydrogenation, optical marks in a film having a plurality of discrete bandgap values.

SUMMARY OF THE INVENTION

It is an object of the invention to provide ion-beam hydrogenation for optical recording, wherein the writing mechanism is caused by "hydrogenation" of amorphous silicon, and the hydrogenated spots have higher transmission than the background a-Si.

Another object of the invention is to provide multiple-level logic optical memory disks using optical bandgap changes caused by ion-beam hydrogenation and/or different silicon-hydrogen bonding configurations—such as monohydride, dihydride, and polysilane chains, i.e. $(SiH_2)_n$.

A further object of the invention is to provide a method of using a laser beam to control the temperature and therefore the formation of silicon-hydrogen bonds during ion-beam hydrogenation of multiple-level optical memory disks.

A yet further object of the invention is to provide an ion-beam-hydrogenated a-Si:H optical recording medium that functions as a multiple-level logic optical memory disk that is erasable by heating to drive out hydrogen.

An object further still of the invention is to provide numerous a-Si-based alloys which can be used to tailor the bandgap of a recording medium that functions as a multiple-level logic optical memory disk.

A still further object of the invention is to provide an a-Si optical disk with built-in sensors. These sensors embody the concept of transmission-mode optical recording devices with a-Si:H or any other photosensitive thin-film sensor arrays deposited on the other side of the glass (or on the same side but behind the transmission mode recording medium). In this case, light transmitted through the recording medium can be detected by the thin-film sensors. Advantages of these kinds of recording devices include:

(a) thin-film recording medium and sensors which are deposited at very low cost;

(b) storage disks which can have any size or shape;

(c) reading capability disks that can be achieved by the use of a flood light, without the need of a laser, where there are no moving parts and the reading is a random access rather than a sequential access method;

(d) a disk where writing may be done by any method as long as the storage medium works in the transmission mode;

(e) recording disk on the electronic mounting rack can be removed, transported, filed, and reloaded for reading without damage and without the need for realignment for reading because the sensor is deposited on the same piece of substrate; and (f) a disk where sensitivity, resolution, and long-term stability of the system are substantially enhanced.

Finally, it is the ultimate objective of the invention to provide multiple level logics characterized by erasability by heating, when ion-beam hydrogenation is used for writing.

This ultimate objective is accomplished by utilizing the highly controllable optical and conductivity properties of a-Si:H for multiple-level logics and using ion-beam hydrogenation techniques for writing or storing information on the disks.

Sequences for preparing the disks include:

Depositing a-Si:H or related alloy films, such as a-Si:H and a-SiN:H on glass substrates using a plasma-enhanced chemical vapor deposition technique at deposition temperatures between about 100° to about 200° C. to ensure good adhesion and high film quality, while at the same time obtaining a high optical bandgap (between about 1.55 and about 2.0 eV) for the a-Si:H film;

Writing information on the disk by using a laser beam to selectively heat spots of a-Si:H to drive out hydrogen and change the bandgap and optical absorption of the film, while controlling the intensity of the laser beam to generate spots of several different bandgaps (because film with different bandgap have different transmission properties); and using a laser beam to detect the information stored.

An alternative sequence for preparing the disks includes:

Depositing a-Si:H or related alloys films, such as a-SiC:H and a-SiN:H, on glass substrates using a plasma-enhanced chemical vapor deposition technique, wherein the temperature of the deposition is between about 100° to about 150° C. to ensure that the film has both SiH and $SiH_2$ bonds;

Writing information on the disk by using a laser beam to selectively heat some areas of the film to drive out $SiH_2$ bonds and some areas of the film to drive out both SiH and $SiH_2$ bonds, so that there are two different types of spots on the film, one with predominantly SiH bonds and one with no SiH and $SiH_2$ bonds at all; and Using a scanning infrared microscope to detect the three different silicon-hydrogen bonding configurations [ternary information storage] on the disk; namely, [1] the background with both SiH and $SiH_2$ bonds, [2] the spots with only SiH bonds, and [3] the spots with no silicon-hydrogen bonds.

A still further sequence for preparing the disk includes:

Depositing a-Si (with no hydrogen) on glass substrates by a physical vapor deposition technique, such as sputtering;

writing information on the disk by hydrogenating regions of a-Si to a-Si:H of various bandgaps using a hydrogen ion beam (A focused ion beam is the preferred; however, a flood ion beam may also be used in combination with shadow masks for high throughput disk production, or a laser beam may be used in combination with the ion beam to control the bandgap [hydrogen content] and silicon-hydrogen bonding configurations); and using a laser or a scanning infrared microscope to read information as in the cases of the other two sequences for preparing the disk.

DETAILED DESCRIPTION OF THE INVENTION

The invention uses low-energy hydrogen ion microlithography to preferentially expose and pattern a selected thin film of either amorphous silicon or hydrogenated amorphous silicon for later microdevice fabrication and semiconductor processing without the need of an organic resist.

In practicing the invention, a disk having a substrate and a starting thin-film layer is formed and processed. The substrate is provided to support a thin film. Depending on the application and final use of the processed disk, the substrate may preferentially be a low-cost metal, a glass, or a plastic material. In the case where an integrated-circuit manufacture device is sought, the substrate will preferentially comprise a glass or a single-crystal semiconductor material with or without an oxide layer. Examples of such semiconductor materials are silicon and gallium arsenide.

After formation of the substrate, it is a feature of the invention to form a base or starting thin film from either an amorphous silicon material or a hydrogenated amorphous silicon material. The amorphous silicon or its hydrogenated form is used as the base material.

In the context of the invention, any number of conventional deposition processes suitable for depositing a thin film of amorphous silicon or hydrogenated amorphous silicon to a thickness of less than about 1 micrometer ($10^{-6}$ m) may be employed. In the case when amorphous silicon material with little or no hydrogen content is chosen for the base layer, it may be deposited by sputtering, photochemical vapor deposition, physical vapor deposition, homogeneous chemical vapor deposition (CVD) or light-induced CVD using infrared lasers. Preferably, a high-quality amorphous silicon layer is deposited onto the substrate under a vacuum by plasma-assisted CVD, which is also known as glow discharge CVD.

In the case where a hydrogenated amorphous silicon layer is selected for the base layer, it can be formed by concurrently introducing the hydrogen and silicon ions therein. As an example, photoinduced CVD is one suitable deposition process for introducing atomic hydrogen into the amorphous silicon during its growth to produce a hydrogenated amorphous film. Ideally, radio frequency (RF) glow-discharge CVD is used for this purpose.

Another suitable deposition process for forming hydrogenated amorphous silicon layers is by introducing hydrogen atoms therein after the deposition of the amorphous silicon layer through post-hydrogenation or rehydrogenation. Post-hydrogenation entails introducing the hydrogen atoms into an amorphous silicon material that was originally deposited with little or no hydrogen content. On the other hand, rehydrogenation entails a process of reintroducing hydrogen atoms into an amorphous silicon material that was originally hydrogenated during its deposition with the hydrogen content having been later driven out by heating. In this regard, it should be noted that post-hydrogenation and rehydrogenation operations are generally performed while the thin film is being preferentially exposed for subsequent development.

RF-generated hydrogen plasma, direct-current (DC) hydrogen plasma and microwave-excited hydrogen plasma are also suitable processes for providing a base layer of hydrogenated amorphous silicon through post-hydrogenation. Preferably, post-hydrogenation is performed by using a low energy hydrogen ion source. Rehydrogenation is preferably performed by using a low-energy, hydrogen ion source with a RF glow-discharge that is deposited when starting with a hydrogenated amorphous material.

In order to effect post hydrogenation and rehydrogenation, any conventional hydrogen ion source suitable for providing a low implantation energy may be used.

A suitable low implantation energy may range from about 250 eV to about 2000 eV.

For this low-energy range in which hydrogen ions are implanted, a suitable current density is in the range of from about 0.1 mA/cm$^2$ to about 20 mA/cm$^2$.

These energy and current density ranges enable the electrical, optical and photosensitivity properties of amorphous silicon films, upon hydrogenation, to be enhanced. An especially preferred hydrogen ion source is the Kaufman-type ion Beam source. An example of such source is one marketed by Commonwealth Scientific Corporation under the trademark Millatron IV. Specific details of the Kaufman Ion Beam System are omitted for the sake of clarity, in view of the fact that the system is well known in the art. Suffice to say, however, this system is equipped with a turbo molecular pump and a chamber capable of being evacuated to a base pressure of about $2\times10^{-6}$ Torr. The system has provisions for backfilling with hydrogen to an operating pressure of approximately $8\times10^{-4}$ Torr. Hydrogen ions are produced in this system by bombarding with high energy electrons. The hydrogen ions are then accelerated and collimated through a stainless steel grid assembly in order to provide ion beams with energy that can be adjusted to any desired level up to a maximum of about 2000 eV.

Having described details of the hydrogen ion source, a brief description of the rehydrogenation and post-hydrogenation operations will now be given to provide a better understanding of the importance of using amorphous silicon or its hydrogenated form as the base layer. The explanation is with respect to the structural changes and development properties occurring in the base layer during the rehydrogenation and post-hydrogenation operations and during exposure.

In post-hydrogenation processes, a thin film of undoped amorphous silicon is preferably deposited by RF glow-discharge under a vacuum onto a high-resistivity, crystalline silicon or glass substrate. The substrate is deposited to a thickness of about 500 nm with a substrate temperature of about 480° C. Thereafter, the deposited amorphous silicon is bombarded by hydrogen at least once. For this purpose, a preferred implantation energy is from about 500 eV to about 600 eV and a preferred current density is about 1 mA/cm$^2$. Subsequently, the resulting hydrogenated film is annealed at a temperature of about 300° C. in a vacuum for about 2 hours.

In the rehydrogenation process, an intrinsic thin film base layer of hydrogenated amorphous silicon is initially deposited by RF glow discharged onto a high-resistivity crystalline substrate to a thickness of about 500 nm at a substrate temperature of about 250° C. (It should be noted that practicing rehydrogenation with starting materials that are not fabricated with the ion source is also contemplated.) Thereafter, the hydrogenated amorphous silicon layer is heated to a temperature above 450° C. The heating causes dehydrogenation or outgassing of the hydrogen.

The dehydrogenated film is then bombarded by low-energy hydrogen ions at least once at a preferred dose of from about 300 eV to about 1000 eV. A preferred implantation time is about 60 minutes, while a preferred current density is about 1 mA/cm$^2$. This implantation time may be much shorter if good electronic properties of the resulting film is not required. Lastly, the rehydrogenated film is annealed at a temperature of around 200° C. in a vacuum for at least 1 hour. While post-hydrogenation and rehydrogenation have been described in connection with two particular illustrations, one skilled in the art will appreciate that the post-hydrogenation and rehydrogenation operating parameters and process steps are not necessarily so limited.

Another important feature is to preferentially or selectively expose the thin film with a low-energy hydrogen ion source. The film, as previously mentioned, comprises a selected thin film layer of amorphous silicon or hydrogenated amorphous silicon. The preferential exposure functions to directly write or transfer a high-resolution, circuit image or line pattern onto the film for subsequent development. The exposure operation also functions to provide a means to enhance or to improve the electrical, optical and photosensitivity characteristics of the selected thin-film material, if so desired for subsequent applications.

Any conventional hydrogen ion source suitable for providing a low implantation energy of from about 300 eV to about 1000 eV may be employed to preferentially expose the deposited chosen layer. A preferred ion source for this purpose is the previously described Kaufman Ion Beam System.

The exposure stage of the thin film follows the film deposition step. The exposure can be performed by either focusing a beam of ions to a spot or by collimating and masking the beam to flood expose the film under hydrogenation. Specific details of the ion beam mask have been omitted from the drawings for the sake of clarity, since general principles of ion beam mask are well known in the microlithography art.

Preferred implantation energy is some value between about 300 eV and 1000 eV, while the preferred current density is some value between 0.1 mA/cm$^2$ and 20 mA/cm$^2$. These implantation ranges are required to provide the necessary structural and chemical changes in the base layer, which changes allow the desired developmental properties of the layer to be realized. Also, the beam diameter should be at least about 10% larger than a diameter of the exposed chip in order to provide satisfactory process uniformity.

In practice, it has been found that the exposure and development properties are different for hydrogenated amorphous silicon materials formed by post-hydrogenation or by rehydrogenation using the ion source. This difference is in regard to the properties of, first, amorphous silicon films having little hydrogen therein and, second, hydrogenated amorphous silicon films, both of which have been formed by other deposition methods. Further, these differences contribute to allowing the single layered thin-film to flexibly function as a negative or positive inorganic resist and a mask wherein a negative resist retains the exposed regions after development, while a positive resist retains the regions not exposed after development.

Preferentially exposing a thin film of amorphous silicon or hydrogenated amorphous silicon not originally hydrogenated with a low-energy hydrogen ion source causes important chemical and structural changes in these films. These changes result from the absorbed or implanted hydrogen atoms and the associated effects they cause upon being diffused into the film. The effects of diffusion involve the amount and arrangement of implanted hydrogen in the film, as well as the type of alloys or bonds formed therein. They also involve the semiconductor properties and the development properties of the exposed film. As previously mentioned, it is seen that the bonding configuration and the amount and distribution of the implanted hydrogen atoms differ in hydrogenated amorphous silicon material formed with a low-energy ion source than with hydrogenated amorphous silicon formed with other methods.

When the thin film is thicker than a range of penetration from the bombarding or impinging hydrogen ions of the ion source, the front surface in the specific regions where it is bombarded accumulates substantial amounts of the absorbed hydrogen. For example, from about 15 at.% hydrogen to about 30 at.% hydrogen accumulates in the first 100 nm of the front surface of the film where it is specifically irradiated. Consequently, the hydrogen accumulating at the front surface is substantially more than that accumulating at the back surface.

It is apparent that the hydrogen absorbed by the film and accumulating at the front and back surfaces depends on the diffusion property of the implanted atomic hydrogen. This diffusion property is a function of temperature and the structure and composition of the film. Because of the diffusion process, the hydrogen accumulating at the front surface decreases exponentially toward the back surface.

Monohydrides or silicon-hydrogen (Si-H) bonds form the dominant bonding configuration where the impinging hydrogen of the low-energy ion source strikes the pure amorphous silicon and the hydrogenated amorphous silicon film materials at a substrate temperature above 200° C. In this way, the front surface becomes substantially saturated with the silicon-hydrogen bonds. Since silicon-hydrogen bonds prevent or retard the oxidation process of a film surface exposed to oxygen, it follows that the silicon-hydrogen bond enriched front surface functions to impede removal or etch action of particular developers.

As a case in point, some particular wet developers can etch or remove desired regions of pure amorphous silicon and hydrogenated amorphous silicon films in a two-step oxidation reaction and oxide etching process, when such films are not formed using the low energy of the hydrogen ion source. However, this oxidation reaction and the etching thereof are impeded with these same wet developers, when identically fabricated films are exposed or hydrogenated with the low energy of the ion source. The retarding action or stop-etch effect occurs, in part, because the front surface is saturated with the silicon-hydrogen bonds introduced by the low-energy hydrogen ion source.

Similarly, some particular dry developers will remove the specific regions of the film preferentially exposed by the ion source, while not removing the non-exposed background regions. This happens because of the chemical and structural film changes resulting from exposing the film with the ion source. With these dry developers, specific film regions are initially provided with surface oxides. The surface oxides function to assist in preventing the removal of the back-ground film regions not exposed by the ion source. Formation of the surface oxides at specific film regions is achieved by, first, oxidizing the surface of a dehydrogenated amorphous film. Thereafter, the surface oxides are selectively removed, and the film is preferentially irradiated with hydrogen ions.

Specific film regions chemically and structurally changed by the absorbed hydrogen, or by the absorbed hydrogen in conjunction with an oxide enriched surface, become resistant to some particular wet and dry developers. These changed film regions become resistant to a number of developers that remove the pure amorphous silicon and the hydrogenated amorphous silicon films having certain film characteristics. Characteristics that enable such removal are: the uniform distribution and disposal of the implanted hydrogen atoms in these film; and film surfaces that are not saturated with silicon-hydrogen bonds or with a combination of these bonds and the surface oxides.

In other words, some developers cannot remove the specific film regions exposed by a low-energy hydrogen ion source. Or, such developers can only remove the exposed film regions at a slower removal rate than the rate at which they normally remove amorphous silicon and hydrogenated amorphous silicon film regions not exposed or hydrogenated with a low-energy hydrogen ion source. It is therefore apparent that those developers that can normally remove or etch amorphous silicon or hydrogenated amorphous silicon film regions unaltered by the exposure effects of the ion source still have this type of removal capability.

After exposure, some developers allow the single-layered thin film to function as a negative resist; because, as mentioned earlier, the hydrogen-irradiated regions remain after development, while the non-irradiated regions are removed. In a like manner, as other particular developers allow removal of the hydrogen irradiated regions of such films, while allowing the non-irradiated regions to remain, and the single thin film is cause to function as a positive resist.

It therefore follows that preferential exposure with the low-energy hydrogen ion source constitutes a method of forming high-resolution features, lines or surface structures, and these features, lines and structures are useful for applications as a microcircuit image or pattern employed in microdevice fabrication and semiconductor processing.

Performing rehydrogenation and post-hydrogenation operations with a low-energy hydrogen ion source enables the resulting hydrogenated amorphous silicon film to undergo structural changes similar to those occurring in the exposed thin film. This holds true in rehydrogenation provided the starting hydrogenated amorphous silicon film was not fabricated with a low-energy hydrogen ion source. Moreover, it will be further understood that performing low-energy, post-hydrogenation and rehydrogenation operations on a chip with the ion source will normally be performed while concurrently exposing the thin film.

Focus is now directed to the fact that, up until now, those skilled in the microelectronics art were not aware that a low-energy, hydrogen ion source could be used in a manner, such as to combine amorphous silicon storage recording film and detector arrays on the same glass substrate to produce an erasable optical recording. The process utilizes the hydrogen ion source to preferentially expose single thin films of amorphous silicon or its hydrogenated form. This exposure provides a new and useful inorganic, negative or positive resist suitable for dry and wet development.

The invention also contemplates using the exposure operations of the hydrogen ion source to enhance or improve the electrical, optical and photosensitivity properties of the thin film during exposure, rehydrogenation and post-hydrogenation. The photosensitivity of a hydrogenated amorphous silicon film is usually expressed by the photo-to-dark-conductivity ratio under certain illumination conditions. In general, a number of detrimental changes are frequently caused by the manner in which the impinging ions during exposure, post-hydrogenation and rehydrogenation act on the semiconductor thin film. Generally, the ions act through sputtering and radiation damage. In practicing the invention, a number of process operations contribute to minimize sputtering and radiation damage, as well as to minimize other detrimental effects that degrade the electrical and semiconductor properties.

Hydrogen is the lightest element in the Periodic Table and therefore substantially minimizes radiation and sputter damages when it is implanted into the film with a low-energy hydrogen ion source. Further, it is found that the acceleration associated with the generated hydrogen ions from the ion source, substantially facilitates the penetration of the ions into the film. Thus, the diffusion of the hydrogen ions from the front surface to the back surface region of a film is readily accomplished. Consequently, hydrogenation performed with the low-energy ion source is substantially more efficient than hydrogenation performed with other methods that provide less acceleration of the hydrogen ions, such as RF-hydrogenation methods.

Further, the implanted hydrogen acts to passivate the exposed thin film, and thus, acts to enhance its photoconductivity. The implanted hydrogen functions to enhance the photoconductivity because the hydrogen content of the film is increased. Moreover, increased levels of hydrogen function to remove localized states and to modify an energy gap of the film material by removing the localized states therefrom.

Still further, using the amorphous silicon or its hydrogenated form as an inorganic resist eliminates all of the problems associated with defects derived from organic resist processing. Moreover, low defect processing is enhanced by performing the fabrication and exposure operations of the chip in a vacuum. Also, such an inorganic resist eliminates all of the remaining non-contamination control process steps associated with conventional organic resist exposure, development and processing. Finally, eliminating the organic resist process operations reduces the cost of the erasable, multiple level logic optical memory disk of the invention.

The publication of Y. S. Tsuo, E. B. Smith, and S. K. Deb, *Ion Beam Hydrogenation of Amorphous Silicon*, Appl. Phys. Lett. 51 (18), pp. 1436–1438 (1987) provides a more complete explanation of the nature and extent to which some properties can be improved through rehydrogenation, using a low-energy hydrogen ion source, and thus publication is incorporated by reference in its entirety. In this instance, photo-to-dark-conductivity ratios as high as $5.6 \times 10^5$ at air mass one with hydrogen-implanted materials were obtained with the Kaufman Ion Beam System. Also, by way of background, this publication points out that light-induced reduction of the photo- and dark conductivities in the rehydrogenated materials after 20 h of one-sun illumination were eliminated. Finally, improvements in the optical bandgap and an ability to controllably incorporate more hydrogen into the rehydrogenated material than was originally deposited by glow discharge was achieved.

When the selected base thin film is amorphous silicon, it can be provided with high photosensitivity properties and stability properties during the exposure or hydrogenation process operations. Moreover, the optical properties can be precisely controlled, while the electrical and photosensitivity properties of the specific thin film regions hydrogenated or exposed by the ion source can be enhanced or improved. In this connection, it should be noted that the control of the optical properties enables the invention to be used in the fabrication of amorphous silicon memory devices.

After exposure of the chip to hydrogen, it is yet another important feature of the invention to employ the selected single thin-film layer as an inorganic mask-resist. This mask-resist is suitable for development by wet or dry developers. During the preferential exposure of the thin film, the exposed regions are structurally changed to record a pattern therein for subsequent development. By recording the pattern lines, it is apparent that the inorganic, mask-resist functioning thin-film is later useful for microdevice fabrication that requires a pattern definition.

Another feature of the invention is to employ both dry and wet developers following exposure. Wet development involves a liquid or solvent etching through oxidation-reduction reactions from metals and displacement. Dry development involves solventless development by sublimation or vaporization of the resist material through direct irradiation or by using a reactive plasma gas to differentiate the image. The plasma gas is a conductive gas with equal densities of positively and negatively charged particles and excited neutral radicals.

A suitable wet developer for etching the exposed selected single layered thin film, when it is functioning as a positive resist, is a solution of isopropyl alcohol (IPA), potassium hydroxide (KOH) and water ($H_2O$) with about 25 wt % or more IPA, about 20 wt % KOH and about 55 wt % $H_2O$.

A suitable wet developer for etching the exposed film, when it is functioning as a negative resist, is a solution of KOH, IPA, and $H_2O$ with about 24 wt % KOH, about 13 wt % IPA and about 63 wt % $H_2O$.

A suitable dry or solventless developer employed to develop the exposed single-layered thin film, when it is acting as a positive resist, is an RF-generated hydrogen plasma. The dry development of the film when it is functioning as a positive resist is preferably performed with the RF-generated hydrogen plasma. It is to be understood that other suitable dry developers having adequate characteristics to effect sublimation of the exposed film or to chemically differentiate the patter thereon when the film is functioning as a positive or negative resist may be employed, as will occur to those skilled in the art.

Similarly, wet developers other than the IPA+KOH+$H_2O$ etchants, having the adequate characteristics to remove the exposed regions or unexposed regions of the thin film at a rate faster than its background and in a controlled manner may be employed, as will occur to those skilled in the art.

The following examples and the description of the figures will serve to illustrate certain preferred embodiments of the present invention and are not to be construed as to limiting the scope of the present invention.

Figure 1:
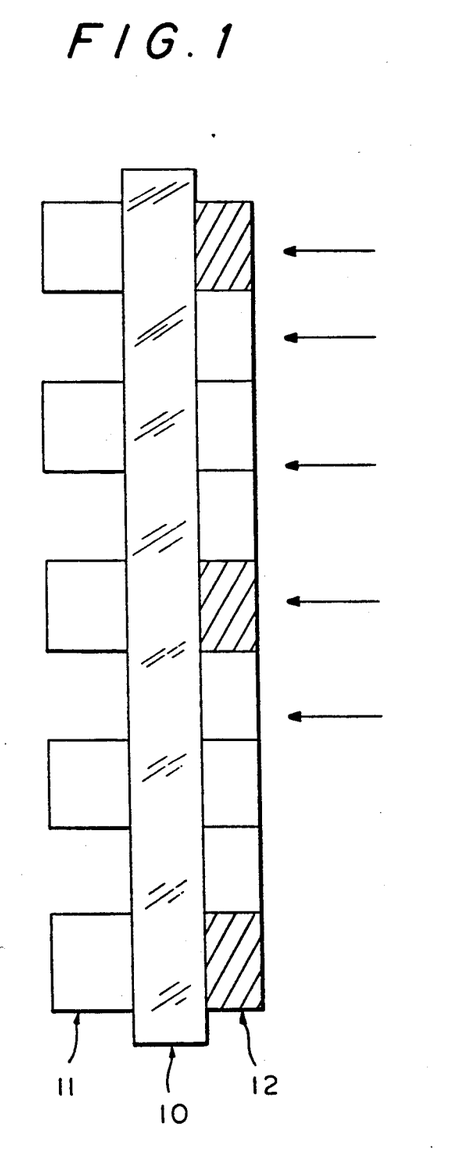
FIG. 1 depicts the combination of an amorphous silicon storage recording film and detector a-Si:H photosensor array.

The combination of an amorphous silicon storage (recording) film and detector arrays on the same glass substrate is shown in FIG. 1, where a glass substrate 10 has a-Si:H photosensor arrays 11 on one side, and ion beam hydrogenated or laser beam dehydrogenated a-Si:H spots 12 on another side, which serves as a transmission mode recording medium. The flood light is depicted by the arrows.

It should be noted that the recording medium can be any transmission mode optical recording medium—in other words, it does not have to be amorphous silicon. The information storage density is limited by the a-Si:H photosensor array density.

The photosensor does not have to be amorphous silicon. Any thin film detector that can be deposited on glass and a transparent front electrode (between the glass and the detectors) will do. The advantages of this structure are: since the detectors are built-in on the same glass substrate, there is no alignment problem and no rotating diskettes; the disk (or plate) can be any size or shape; any flood light that can be either transmitted or blocked will do; no laser or any scanning mechanisms are required; no moving parts are required and information can be read electronically; random-access reading and writing is permitted; there is low cost, since the recording medium and detector arrays are made of thin films deposited on glass and the cost of fabricating the disk should be low; sensitivity, resolution and long-term stability of the system is substantial; the recording disk can be removed, transported, reloaded or left permanently in an electronic mounting place without damage and without the need for realignment ever; since the information can be read electronically without any moving parts, the reading can be done remotely (without moving anything) through a modem.

EXAMPLE 1 a-Si:H is deposited on glass substrates using plasma-enhanced chemical vapor deposition, where the temperature of the deposition is kept between 100° to 100° C. to ensure good adhesion and high film quality and at the same time obtain a high optical bandgap of between 1.8 to 2.0 eV for the a-Si:H film.

Information is written on the disk by using a laser beam to selectively heat spots of hydrogenated a-silicon to drive out hydrogen and change bandgap and optical absorption of the film. The intensity of the laser beam is controlled to generate spots of several different bandgaps of 1.6 eV, 1.7 eV, 1.8 eV on a 1.9 eV background so that 4-level logic is obtained, and to provide films with different bandgaps having different transmission properties.

The stored information is detected by using a light emitting diode (LED) or a laser operating at around 600 nm wavelength. Alternatively, a commercial compact disk (CD) player read laser may also be used to read the information. Yet still, shorter wavelength compact emitters such as GaN blue emitters may be used in order to read the information.

Information stored on these hydrogenated amorphous silicon films can be erased by heating the film above 400° C. to drive out the hydrogen and rehydrogenate the film.

As mentioned, a major advantage of using amorphous silicon hydride for optical information storage, either by changing the bandgap or by changing the silicon hydrogen bonding configurations is the benefit of obtaining multiple-level logic.

EXAMPLE 2

Same as Example 1, except that a-SiC:H alloy films are deposited on glass substrates to obtain comparable results.

EXAMPLE 3

Same as Example 1, except that a-SiN:H allow films are deposited on glass substrates to obtain comparable results.

EXAMPLE 4

Hydrogenated amorphous silicon is deposited on glass substrates using plasma-enhanced chemical vapor deposition at temperatures between 100° to 150° C. in order to ensure that the film has both SiH and $SiH_2$ bonds.

Information is written on the disk by using a laser beam to selectively heat some areas of the film to drive out $SiH_2$ bonds and some areas of the film to drive out both SiH and $SiH_2$ bonds, and this results in a film having two different types of spots, one with predominantly silicon hydride bonds and one with no silicon hydride and silicon dihydride bonds at all.

A scanning infrared microscope is used to detect the three different silicon-hydrogen bonding configurations (ternary information storage) on the disk, for example [1] the background with both silicon hydride and silicon dihydride bonds, [2] the spots with only SiH bonds, and [3] the spots with no silicon-hydrogen bonds.

The scanning infrared microscope easily differentiates states of amorphous SiH with no hydrogen, with predominantly monohydride bonds and with predominantly dihydride bonds, forming the basis of a 3-level logic (ternary) system. A commercial FT-IR spectrometer operating in a step-scan mode at a rate of up to 800 steps/sec. collects data at 5 $\mu$sec intervals with a minimum image resolution of 0.5 $\mu$m.

EXAMPLE 5

Same as Example 4, except that a-SiC:H alloy film is deposited on glass substrates with comparable results.

EXAMPLE 6

Same as Example 4, except that a-SiN:H alloy film is deposited on glass substrates with comparable results.

EXAMPLE 7 a-Si (with no hydrogen) is deposited on glass substrates by the physical vapor deposition technique of sputtering.

Information is written on the disk by hydrogenating regions of a-Si to a-Si:H of various bandgaps using a hydrogen ion beam. A focused hydrogen ion beam with a beam diameter as low as 8 nm is preferred. Alternatively, a flood beam which exceeds the periphery of the disk by up to 10% may be used in combination with shadow mask for high throughput disk production. Further still, a laser beam may be used in combination with the ion beam to control the bandgap (hydrogen content) and the silicon-hydrogen bonding configurations.

The information recorded is read either by using the laser as described above or a scanning infrared microscope as described above.

It should be noted that optical-storage technology has been accepted as a viable and in some cases preferred storage medium. However, most optical recording media are made of low-melting-temperature material and have a life span of only 10 to 20 years. They are mainly used in consumer electronic products, where long-term integrity of the stored information is not essential. However, if optical disks are to be used as a data archival medium, they must last much longer than the papers and books they are replacing. Consequently, there is a need for developing optical recording media with long life spans.

Hydrogenated amorphous silicon (a-Si:H), with its excellent structural uniformity and stability, low-temperature thin-film deposition on glass, and highly adjustable optical properties, is an ideal candidate for an archival optical information storage medium. In addition, it is possible to utilize the unique optical properties of a-Si:H for erasable, multiple-level-logic memory disks.

Although it is well known that the photoelectric properties of a-Si:H suffer photo-induced degradation (the so-called Staebler-Wronski effect), the optical transmission properties and structural properties (such as the hydrogen content and the silicon hydrogen bonds) are very stable.

This stability has permitted studying the effects of laser irradiation and ion-beam hydrogenation of a-Si:H on the optical properties of this material, and has given rise to using the changes in optical bandgap, conductivity, or hydrogen bonding configurations for multiple-level-logic.

The glass substrates that a-Si:H films are deposited on are harder and smoother than conventional plastic disks (as in audio technology), and this enables translation to higher data capacity and speed. The optical and structural properties of a-Si:H films have proven to be very stable; however, laser and electron beams are used to change the reflection, deflection, and transmission properties of a-Si:H or a-Si films for optical recording. Examples include (1) laser- or electron-beam-induced crystallization, (2) laser-induced out-diffusion of hydrogen, (3) surface texture modification by rapid hydrogen effusion (optical reading by detecting changes in the light diffraction or scattering properties of the film surface due to dehydrogenation-induced microswelling in a-Si:H, (4) electron-beam writing and reading (using the Auger effect to detect reversible resistivity changes in a-Si:H), and (5) optical recording in relation to Raman spectra. However, optical diffraction and lateral heat diffusion in the a-Si:H limit the resolution of crystallization and surface texture modification techniques. Another problem of most of these techniques is that the recording is not erasable. Detecting Auger and Raman effects is inconvenient for information storage devices.

The invention uses laser-beam heating and ion-beam hydrogenation to control the optical bandgap and bonding configurations of a-Si:H for multiple-level logic optical information storage disks. The optical bandgap of a-Si:H can be adjusted between 1.55 and 2.0 eV by heating (dehydrogenation) and hydrogenation. There are four different bonding configurations of silicon and hydrogen CiH, $SiH_2$, $SiH_3$, and $(SiH_2)_a$. Each of these bonds has its characteristic infrared absorption frequencies. For example, the monohydride bonds have stretching mode absorption at 2000 $cm^{-1}$ and the dihydride bonds have stretching mode absorption at 2090 $cm^{-1}$ and bending mode absorption at 880 $cm^{-1}$. The dihydride bonds break at about 300° C. and monohydride bonds break at about 400° C. The number of monohydride and dihydride bonds in an as-deposited a-Si:H depends on the film deposition and the posthydrogenation temperature—the lower the temperature, the higher the number of dihydride bonds.

By controlling the local hydrogen content and therefore the bandgap of an a—Si:H film, we can create regions of a—Si:H with different optical absorption properties that can be easily detected with the CD operating in the transmission mode. The data stored does not have to be limited to the binary "on" and "off" states. This greatly increases the information storage capacity. Similarly, with a scanning infrared microscope we can easily differentiate states of a—Si:H with no hydrogen, with predominantly monohydride bonds, and with predominantly dihydride bonds, forming the bases of a three-level logic (ternary) system. Commercial FT-IR spectrometer can operate in the step-scan mode at a rate of up to 800 steps/second and collect data at 5 $\mu$s intervals with a minimum image resolution of 0.5 $\mu$m (Specification of the scanning infrared microscope by Spectra Tech Applied Systems).

The dark conductivity and photoconductivity of a-Si:H changes over 5 orders of magnitude as a function of the hydrogen content. For example, the dark conductivity changes from about $10^{-5}$ S/cm for a-Si with no hydrogen content to about $10^{-10}$ S/cm for a-Si:H with about 15% hydrogen content. This property may also be used in an information storage device. The writing would be done with hydrogenation and dehydrogenation. The reading would be done by making electrical contacts with dimensions in the micrometer range using standard photolithographic techniques for integrated circuits (IC) and thin-film transistors (TFT).

The ion-beam writing can be done with either a flood beam with a shadow mask for high throughput or a focused ion beam with a beam diameter as small as 8 nm for small dimensions.

Laser irradiation and ion-beam hydrogenation can be used to change the optical properties of a-Si:H. The optical absorption of a-Si:H is a function of laser power or ion beam hydrogenation conditions. In particular, the IR absorption modes of SiH and $SiH_2$ are likely to be the most affected parameters of the material. The correlation between the IR vibrational modes and the power in the write beam will be important to clarify the process of changing the absorption properties of a-Si:H.

In the context of this invention, hydrogenated amorphous silicon thin films are chosen for information storage because this material can be readily deposited as a uniform film over a large area, and the material is inexpensive and resistant to various atmospheric ambient. Information can be recorded with a laser beam that causes non-reversible physical changes that can be probed rapidly by optical means. Thus an Ar laser can be used to cause crystallization, blistering or photodarkening. The latter effect requires the least energy (power). The darkening can be read by transmission with the same or a different laser than the one used for writing. The power needed to write the information (a thermal effect) can be reduced if the film is made thinner and if the substrate is thermally insulating. Ion-beam hydrogenation may also be used to change the optical bandgap and thus the transmission properties of a-Si:H.

To read the information one can use an LED or laser operating at around 600 nm wavelength. A commercial CD player's read laser may work for the reading purpose. Shorter wavelength compact emitters are also possible, e.g., the GaN blue emitter. The information stored on the a-Si:H films can be erased by heating the film to above 400° C. to drive out the hydrogen or by rehydrogenating the entire film area.

A major advantage of using a-Si:H for optical information storage either by changing the bandgap or by changing the silicon-hydrogen bonding configurations is the possibility for multiple-level logic.

What is claimed is:

1. A process for preparing a multiple level logic optical memory disk which is erasable upon heating, comprising:
    depositing an amorphous film selected from the group consisting of silicon hydride, silicon carbon hydride and silicon nitrogen hydride on a glass substrate using plasma enhanced chemical vapor deposition at temperatures sufficient to ensure good adhesion, high film quality and an optical bandgap of between about 1.55 and about 2.0 eV;
    preferentially exposing said film to a hydrogen ion source of low implantation energy;
    writing information on said disk by using a laser beam to selectively heat some spots of said film to expel hydrogen and change the bandgap and optical absorption of said film, said bandgap being changed to several different bandgaps;
    and using a laser beam at sufficient wavelength to detect information stored on said disk.

2. The process of claim 1, wherein the film is a-Si:H; the temperature of deposition is between about 100° to about 200° C.; the optical bandgap is between about 1.8 and 2.0 eV; wherein said several different bandgaps are four different bandgaps; and wherein the laser beam to detect stored written information is operated at a wavelength of about 600 nm.

3. The process of claim 2, wherein the four different bandgaps are 1.6 eV, 1.7 eV, 1.8 eV and 1.9 eV.

4. An erasable, multiple level logic optical memory disk prepared by the process of claim 1.

5. An erasable, multiple level logic optical memory disk prepared by the process of claim 2.

6. An erasable, multiple level logic optical memory disk of hydrogenated amorphous silicon prepared by the process of claim 3; said disk being erasable by heating at temperatures above about 400° C. to expel hydrogen.

7. An erased, multiple level logic optical memory disk of claim 6, that is rehydrogenated.

8. A process for preparing erasable, multiple level logic optical memory disk, comprising: depositing an amorphous film selected from the group consisting of silicon hydride, silicon dihydride, silicon carbon hydride and silicon nitrogen hydride on a glass substrate using plasma-enhanced chemical vapor deposition at a temperature sufficient to provide both silicon hydride and silicon dihydride bonds;
    writing information on the disk by using a laser beam to selectively heat some areas of the film to destroy silicon dihydride bonds and some areas of the film to expel both silicon hydride and silicon dihydride bonds in order to provide spots on the film with predominantly silicon hydride bonds and spots on the film with no silicon hydride and silicon dihydride bonds;
    using scanning infrared microscopy means to detect three different silicon-hydrogen bonding configurations; said configurations being a background with both silicon hydride and silicon dihydride bonds, spots with only silicon hydride bonds, and spots with no silicon-hydrogen bonds.

9. The process of claim 8, wherein the film is a-Si:H; the deposition temperature is between about 100 and about 150° C. and the scanning infrared microscope is operated in a step-scan mode at a rate of up to 800 steps/sec. to collect data at about 5 $\mu$sec intervals with a minimum image resolution of about 0.5 $\mu$m.

10. An erasable, multiple level logic optical memory disk prepared by the process of claim 8.

11. An erasable, multiple level logic optical memory disk prepared by the process of claim 9.

12. A process for preparing erasable, multiple level logic optical memory disk, comprising: depositing a-Si having no hydrogen on a glass substrate by physical vapor deposition means;
    writing information on said disk by hydrogenating regions of a-Si to a-Si:H of varying bandgaps using a hydrogen ion beam; and
    using laser means or scanning infrared microscopy means to detect information written on said disk.

13. The process of claim 12, wherein a focused hydrogen ion beam of a submicron beam size is used to write information on said disk.

14. The process of claim 12, wherein a flood hydrogen ion beam is used in combination with shadow mask for high throughput disk production.

15. The process of claim 12, wherein a laser beam is used in combination with said hydrogen ion beam to control bandgap or hydrogen content and silicon-hydrogen bonding configurations.

16. An erasable, multiple level logic optical memory disk prepared by the process of claim 12.

17. An erasable, multiple level logic optical memory disk prepared by the process of claim 13.

18. An erasable, multiple level logic optical memory disk prepared by the process of claim 14.

19. An erasable, multiple level logic optical memory disk prepared by the process of claim 15.

20. An erasable, multiple level logic optical memory disk comprising compounds selected from the group consisting of ion-beam hydrogenated amorphous-silicon, amorphous-silicon carbon and amorphous-silicon nitrogen wherein said disk comprises four different bandgaps having values of about 1.6 eV, 1.7 eV, 1.8 eV and 1.9 eV.

21. An erasable, multiple level logic optical memory disk as in claim 20, wherein information stored on said disk is erasable by heating said disk above about 400° C. to expel hydrogen.

22. A dehydrogenated disk comprising the materials of claim 21 that is rehydrogenatable.

23. An erasable, multiple level logic optical memory device comprising an ion-beam hydrogenated amorphous silicon recording film and Si:H photosensor detector arrays on a single glass substrate, wherein said Si:H photosensor arrays are disposed on one side of said glass substrate and said ion-beam hydrogenated amorphous silicon recording film has regions of a-Si:H of varying bandgaps and is disposed on an opposite side of said glass substrate.

24. The erasable, multiple level logic optical memory device of claim 23, except that the photosensor arrays are a-SiC:H photosensor arrays and said ion-beam hydrogenated silicon recording film is a-SiC:H.

25. The erasable, multiple level logic optical memory device of claim 23, except that the photosensor arrays are a-SiN:H photosensor arrays and said ion-beam hydrogenated silicon recording film is a-SiN:H.

26. The erasable, multiple level logic optical memory device of claim 23, except that said amorphous recording film is laser beam dehydrogenated.

27. The erasable, multiple level logic optical memory device of claim 24, except that said amorphous recording film is laser beam dehydrogenated.

28. The erasable, multiple level logic optical memory device of claim 25, except that said amorphous recording film is laser beam dehydrogenated.

* * * * *